(No Model.) 2 Sheets—Sheet 1.

J. H. SWIHART.
PRICE AND WEIGHING SCALE.

No. 575,077. Patented Jan. 12, 1897.

WITNESSES:
Lester L. Allen.

INVENTOR
John H. Swihart.
BY R. J. McCarty.
ATTORNEY.

(No Model.) 2 Sheets—Sheet 2.

J. H. SWIHART.
PRICE AND WEIGHING SCALE.

No. 575,077. Patented Jan. 12, 1897.

WITNESSES:
Lester L. Allen

INVENTOR
John H. Swihart
BY
P. J. McCarty
ATTORNEY.

UNITED STATES PATENT OFFICE.

JOHN HENRY SWIHART, OF DAYTON, OHIO, ASSIGNOR TO THE NATIONAL COMPUTING SCALE COMPANY, OF CLEVELAND, OHIO.

PRICE AND WEIGHING SCALE.

SPECIFICATION forming part of Letters Patent No. 575,077, dated January 12, 1897.

Application filed April 10, 1895. Renewed June 19, 1896. Serial No. 596,222. (No model.)

*To all whom it may concern:*

Be it known that I, JOHN HENRY SWIHART, of Dayton, county of Montgomery, State of Ohio, have invented a new and useful Improvement in Price and Weighing Scales; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in computing-scales.

The object of said invention is to provide a scale in which the beams are so connected that the one having a changeable fulcrum will be permitted at all times to turn upon its pivot unaffected by the different arcs described by the beams that have a fixed fulcrum.

A further object is to provide a movable bearing for one of said beams the movement of which does not necessitate the employment of a counterweight.

A further object is to provide a price-per-pound beam that has a capacity for indicating a maximum price per pound; and a still further object is to provide a scale of this class in which the beams are evenly balanced, to the end that more accuracy is obtained in weighing light articles.

To these ends the invention consists of parts and their arrangements that will be described in the specification and set out in the claims.

Figure 1:
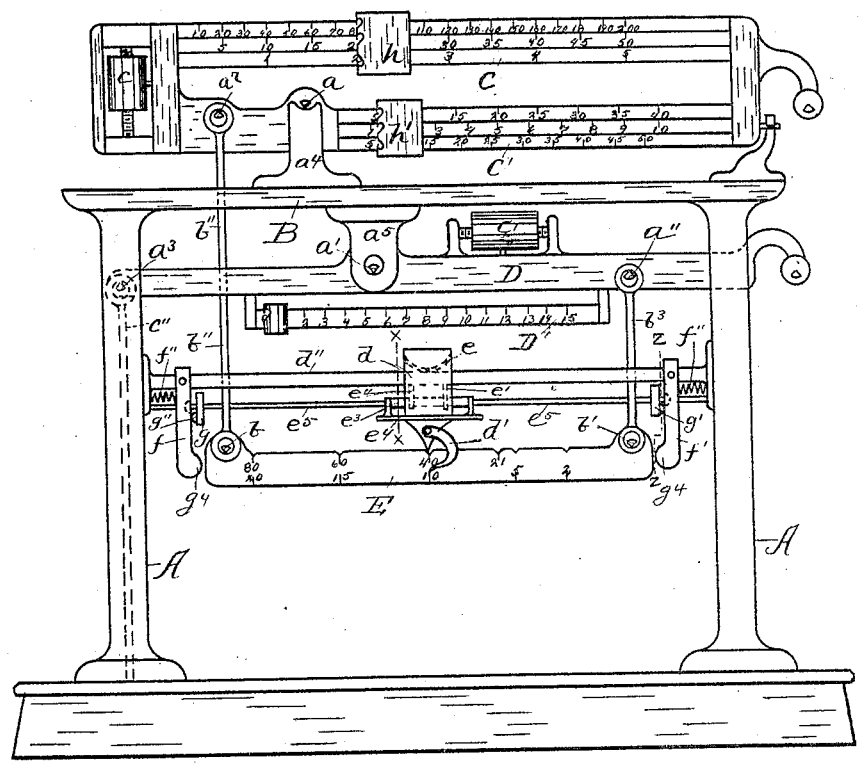
Figure 2:
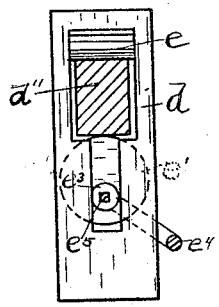
Figure 4:
Figure 3:
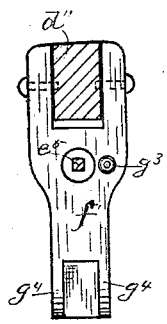
Figure 5:
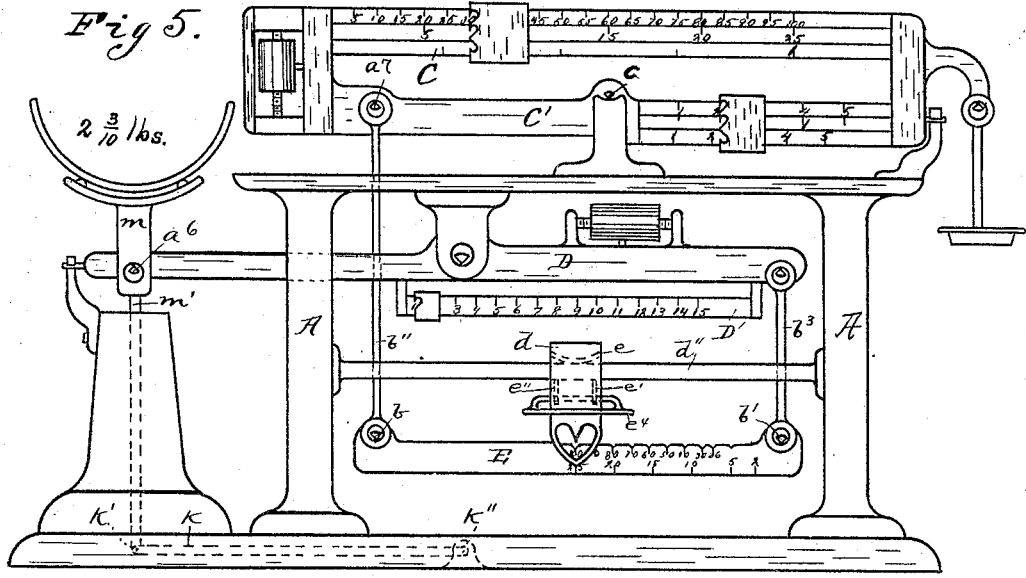
Figure 6:
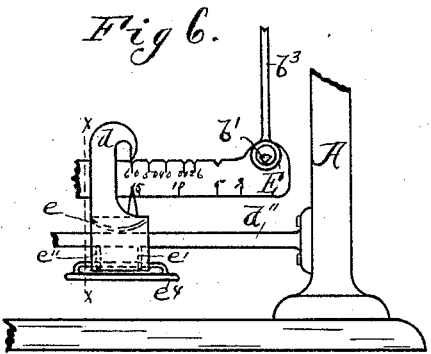
Figure 7:
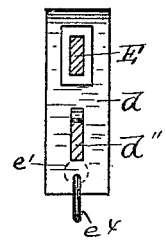

Referring to the annexed drawings, upon which similar letters of reference indicate corresponding parts, Figure 1 is a side elevation of a platform-scale constructed in accordance with my invention; Fig. 2, a section on the line $x\,x$ of Fig. 1; Fig. 3, a section on the line $z\,z$ of Fig. 1; Fig. 4, a detached view of an element of the beam-holding devices; Fig. 5, a side elevation of a modified form, showing my invention applied in the form of an even-balance scale; Fig. 6, a detached view showing a modified form of bearing for the price-per-pound beam; Fig. 7, a section on the line $x$ of Fig. 6.

A A designate standards that rise from a platform and support an upper platform or base B, on which two rigidly-connected weight and value beams C C' are mounted on beam-standards $a^4$ and have a fixed fulcrum on knife-edge bearings $a$.

D designates a beam or lever mounted below said base on beam-standards $a^5$ and having a fixed fulcrum on knife-edge bearings $a'$ midway between the pivots $a''\,a^3$.

$c\,c'$ are balance and gravity weights for said respective beams.

D' designates a bar lying parallel with the beam D and depended therefrom. This bar is provided with figures that represent weight, and may be used as a weighing or tare beam throughout its length. When the bar D' is mounted as shown, it extends longitudinally beyond the fulcrum of the beam D, and thereby a greater numerical capacity is obtained for said beam as compared with a beam which is divided longitudinally by a fixed fulcrum or one that has a link connected at an intermediate point thereof.

$c''$ designates a vertical rod on knife-edge bearings $a^3$ on an extremity of the beam D, and having its lower end connected to the platform-levers. (Not shown.)

E is a suspended beam having figures throughout its length that denote prices per pound. The full capacity of the beam for this purpose is utilized by mounting it at its extreme ends on knife-edge bearings $b\,b'$, from which points it is coupled to the beams C' and D at $a'$ and $a''$ by links $b''$ and $b^3$.

$d$ designates a movable bearing for said beam, having a knife-edge bearing that points to the figures on the upper part, and a downwardly-projecting pointer $d'$, that indicates the figures on the lower part of said beam. The bearing $d$ is preferably mounted above the beam on a parallel bar $d''$, the ends of which are rigidly attached to the main standards of the scale, so that the weight of said bearing will at no time be upon any of the movable parts of the scale, which is a conspicuous feature of this invention and one that I desire to cover by a broad claim. The bearing is susceptible of a vertical adjustment in order to free it from the beam in shifting said bearing from one point to another through the following devices:

$e$ designates a slightly-curved spring inclosed in the upper part of the bearing and normally pressing upon the upper part of said bearing and upon the bar $d''$. The office of this spring is to lift said bearing from contact with the beam E.

$e'$ and $e''$ designate cam-disks that are inclosed in suitable openings in the lower part of the bearing and are rigidly attached to a sleeve $e^3$, that projects through said bearing. This sleeve is provided with a handle portion $e^4$, that lies on the outside of the bearing, and said sleeve is mounted upon a parallel rocker-shaft $e^5$, rectangular in cross-section, and having its ends rounded to journal in the main standards in any suitable manner. The spring $e$ is permitted to lift the bearing when the cams $e'$ $e''$ are turned by means of the handle $e^4$ to bring the lowest part of said cams in contact with the bar $d''$. This is accomplished by pressing upwardly upon said handle, pressing downwardly upon said handle having the opposite effect, to wit, to place said bearing in contact with the beam, as is shown in the drawings. This bearing may be mounted below the beam, as shown in Fig. 6, without departing from the essential features thereof.

As a means for arresting the vibrations of the beam E when the bearing is removed therefrom, $f\ f'$ designate two bifurcated levers pivoted to the bar $d''$ and depending in proximity to the ends of said beam. These levers have each a countersunk recess $g^3$ (see Fig. 3) and are pressed inwardly by spiral springs $f''\ f'''$ against disks $g\ g'$, that are mounted on and turn with the rocker-shaft $e^5$. Each of these disks has upon its inner face an oval projection $g''$, that presses upon the levers to hold them away from the beam when the scale is in operation. Upon rocking the shaft $e^5$ to operate the bearing, as hereinbefore described, the projections $g''$ are caused to enter the recesses $g^3$, and the levers are pressed against the beam by the springs to lock said beam for the time being between the flanges $g^4$.

In operation the bearing $d$ is shifted to the desired point on the beam E. The goods are then placed on the platform, and the poise or poises $h\ h'$ are moved out on the beams C C' until the scale balances, at which time the value of the goods is read off said beams in the usual manner.

By coupling the ends of the beam E to the beams C' and D, as shown in the drawings, all of the beams may move simultaneously and yet be permitted to describe their respective arcs freely, which is another important feature of this invention.

The scale as modified in Fig. 5 is adapted for lighter weights and is susceptible of an even balance when the bearing $d$ is moved to the longitudinal center of the beam E. The constructions in both forms are substantially the same, but in adapting the invention to the uses of a lighter scale it is desirable to place the fulcrum of the beams C C' at their longitudinal center in order to have a scale as near the even-balance type as possible. The connecting-rod $c''$ and platform-levers are dispensed with in this form of scale. The beam D is extended beyond the standard A and is provided with a knife-edge bearing $a^6$, upon which a scoop-support $m$ is supported. $m'$ is a vertical rod connected to said support and having its lower end pivotally connected to a horizontal check-rod $k$ at $k'$, which check-rod is pivoted at $k''$ to the base of the scale. As the drawing now appears, the scale is in even balance. The bearing $d$ indicates the dollar-per-pound rate. The scoop contains two and three-tenths pounds of goods, and the value of said goods, as shown on the beams, is two dollars and thirty cents.

Having fully described my invention, I claim as new and desire to secure by Letters Patent—

1. In a computing-scale, the combination of the value-beam, an auxiliary beam, two flexible links suspended respectively from said value-beam and auxiliary beam, a price-per-pound beam suspended from and lying between said links, a movable fulcrum adapted to engage with the upper side of the price-per-pound beam, a support for said fulcrum, means for raising and lowering said fulcrum out of and into contact with the price-per-pound beam, and a connecting-rod for connecting the auxiliary beam with the scale-platform or platform-levers, substantially as and for the purposes specified.

2. In a computing-scale, the combination of the value-beam, and an auxiliary beam, with two flexible links suspended respectively from the value-beam and auxiliary beam, a price-per-pound beam suspended from and lying between said links, a movable fulcrum-block adapted to engage with the top edge of said price-per-pound beam, a horizontal bar for supporting and guiding said fulcrum-block, mechanism for moving the fulcrum-block out of and into engagement with the price-per-pound beam, two spring-pressed plates for engaging with the ends of the price-per-pound beam, and mechanism which withdraws said plates from contact with the price-per-pound beam when the fulcrum-block is lowered into contact with the price-per-pound beam, substantially as and for the purposes specified.

3. In a computing-scale, the combination of the value-beam, and an auxiliary beam both fulcrumed in the same vertical plane, a flexible link suspended from the value-beam on one side of said vertical plane, a flexible link suspended from the auxiliary beam on the other side of said vertical plane, a price-per-pound beam suspended from and lying between said links, a movable fulcrum adapted to engage with the top edge of said price-per-pound beam, and means for raising and lowering said fulcrum out of and into engagement with said price-per-pound beam, mechanism for preventing longitudinal movement of the price-per-pound beam when the fulcrum therefor is raised, and a connecting-rod suspended from the auxiliary beam at a point on the opposite side of the beam-fulcrum from the link which is suspended from said beam, and at an equal distance from said fulcrum, substantially as and for the purpose specified.

4. In a computing and weighing scale, the combination with a beam denoting prices per pound, of a movable bearing mounted wholly independent of the movable parts of the scale and adapted to be moved approximately the entire length of the graduated part of said beam, and means for placing said bearing in and out of contact with said beam, substantially as described.

5. In a computing and weighing scale, the combination with a beam denoting prices per pound, of a movable bearing for said beam, a parallel bar rigidly mounted on stationary parts of the scale and upon which said bearing is supported, spring and cam devices inclosed within said bearing adapted to raise and lower it, substantially as described.

6. In a computing and weighing scale, the combination with beams upon which weights and values are shown, of an auxiliary beam provided with a depended bar having figures thereon denoting weights, a beam denoting prices per pound depended from said weight and value and auxiliary beams, a movable bearing for said price-per-pound beam movable the entire length of the graduated part of said beam, said bearing being mounted wholly independent of the movable parts of the scale, substantially as described.

7. In a computing and weighing scale, the combination with weight and value beams, of an auxiliary beam, a price-per-pound beam one end of which is coupled to the value and weight beams and the other end of which is coupled to the auxiliary beam, a graduated scale depended from said auxiliary beam and extending past the fulcrum of said beam, a movable bearing for said price-per-pound beam mounted wholly independent of the movable parts of the scale and movable the entire length of the graduated part of said beam, substantially as described.

8. In a computing and weighing scale, the combination with a beam, of a movable bearing for said beam, parallel bars mounted above said beam upon one of which said bearing is supported, and spring and cam devices inclosed within said bearing for placing the bearing in and out of contact with the beam, levers and cams mounted on one of said parallel bars for holding the beam when the latter is free from its movable bearing, substantially as described.

9. The combination with upper weight and value beams, of an intermediate beam, a bar depended from said intermediate beam extended past the fulcrum thereof and indicating weight, a price-per-pound beam having its ends connected to the upper and intermediate beams, a movable fulcrum for said price-per-pound beam, a connecting-rod pivoted to the opposite end of said intermediate beam and adapted to support a scoop or to be connected with the platform-levers whereby the load that actuates the beams will move them in their respective arcs, substantially as described.

10. In a computing and weighing scale, the combination with the upper beams C, C', of the beam D having pivots equidistant from its fulcrum, a graduated bar depended from said beam D, a price-per-pound beam E having its ends connected to the pivots of beams C' and D by links $b''$ and $b^3$, a movable bearing for said beam E mounted on a stationary bar adjacent to the beam and independently of the movable parts of the scale, spring inclosed in the upper part of said bearing, cams inclosed in the lower part of said bearing, a sleeve having a handle to which said cams are attached, a rocker-shaft upon which said sleeve is mounted, levers pivoted adjacent to the ends of said shaft, and cams rigidly mounted on said shaft adjacent to the levers and adapted to be brought in contact therewith to maintain said levers out of contact with the ends of the price-per-pound beam, and springs for pressing said levers in contact with the beam when freed from the cams, substantially as described.

In testimony whereof I have hereunto set my hand this 5th day of April, 1895.

JOHN HENRY SWIHART.

Witnesses:
R. J. McCARTY,
CHARLES W. DOLE.